JOSEPH ORSZÁG & JOHN ORSZÁG.
TROLLEY.
APPLICATION FILED JAN. 12, 1910.

971,399.

Patented Sept. 27, 1910
2 SHEETS—SHEET 1.

Witnesses:
A. H. Rabsag,
K. H. Butler

Inventors:
Joseph Orszag, and
John Orszag,
by their Attorneys

JOSEPH ORSZÁG & JOHN ORSZÁG.
TROLLEY.
APPLICATION FILED JAN. 12, 1910.
971,399.
Patented Sept. 27, 1910.
2 SHEETS—SHEET 2.
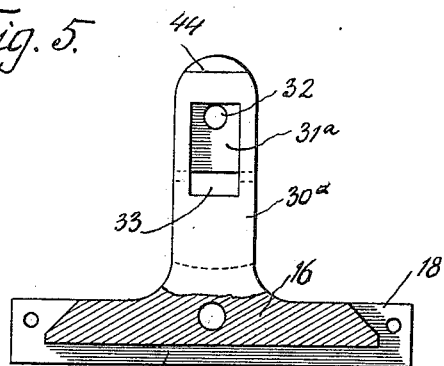
Fig. 5.
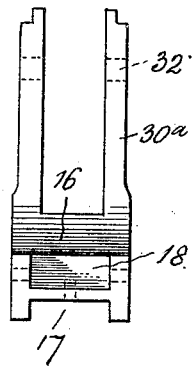
Fig. 6.
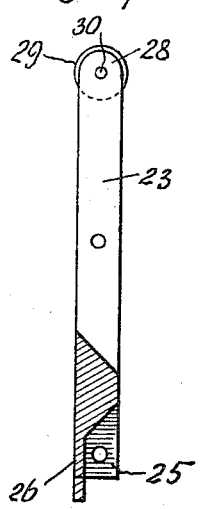
Fig. 7.
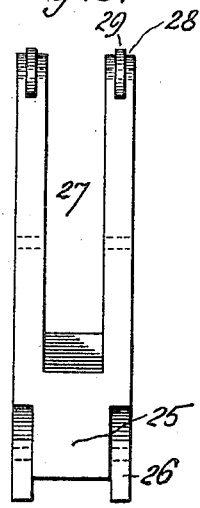
Fig. 8.
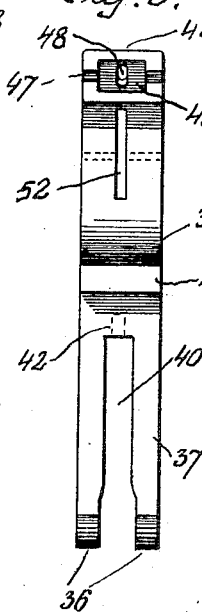
Fig. 9.
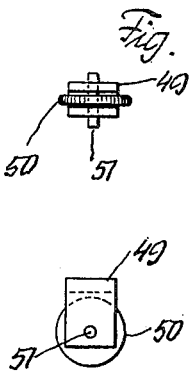
Fig. 10.
Fig. 11.
Witnesses:
A. H. Rabság,
R. H. Butler
Inventors:
Joseph Ország, and
John Ország,
by: attorneys

UNITED STATES PATENT OFFICE.

JOSEPH ORSZÁG AND JOHN ORSZÁG, OF ASHTABULA, OHIO.

TROLLEY.

971,399.  Specification of Letters Patent.  Patented Sept. 27, 1910.

Application filed January 12, 1910. Serial No. 537,635.

*To all whom it may concern:*

Be it known that we, JOSEPH ORSZÁG and JOHN ORSZÁG, subjects of the King of Hungary, residing at Ashtabula, Sweden, in the county of Ashtabula and State of Ohio, have invented certain new and useful Improvements in Trolleys, of which the following is a specification, reference being had therein to the accompanying drawing.

This invention relates to trolleys, and the objects of our invention are to provide a trolley that will not become accidentally displaced from the trolley wire or electrical conductor due to a car passing around a curve or traveling at considerable rapidity, and to furnish a car with a trolley that will not interfere with wire hangers, supports, frogs, cross-overs, and bridge structures.

Further objects of our invention are to furnish a trolley with positive and reliable means for retaining the same upon the trolley wire, and to accomplish the above results by a structure that is durable and highly efficient for the purposes for which it is intended.

We attain the above objects by the novel construction, combination and arrangement of parts to be hereinafter specifically described and then claimed.

Reference will now be had to the drawings forming a part of this specification, wherein there is illustrated a preferred embodiment of our invention, but it is to be understood that the structural elements thereof can be varied or changed, as to the size, shape and manner of assemblage, without departing from the spirit of the invention.

Figure 1:
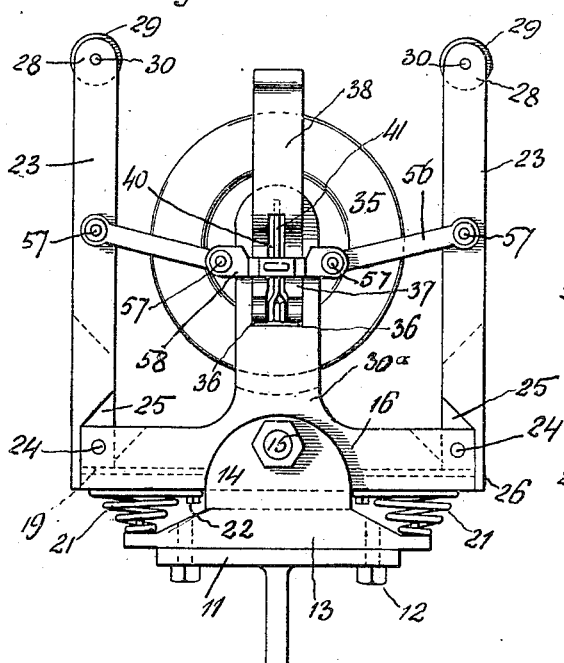
Figure 2:
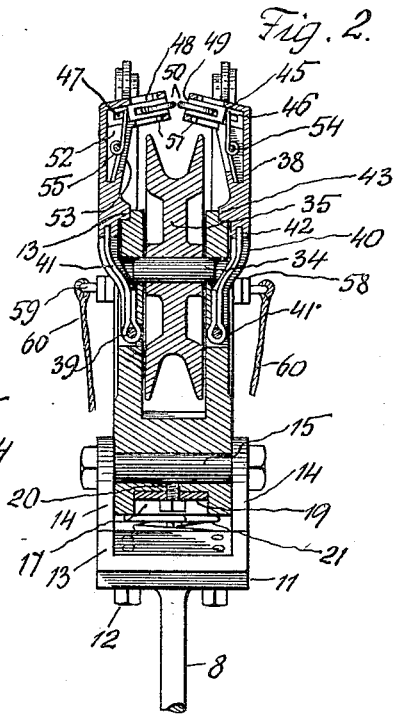
Figure 3:
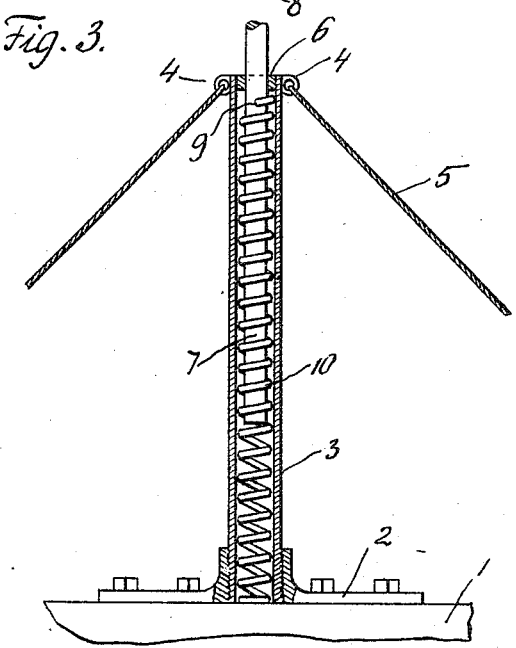
Figure 4:
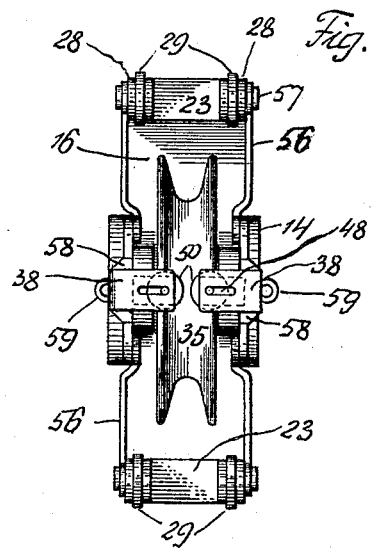

In the drawings:—Figure 1 is a side elevation of a trolley harp constructed in accordance with our invention. Fig. 2 is a vertical cross sectional view of the same. Fig. 3 is a vertical sectional view of the trolley pole base. Fig. 4 is a plan of the trolley harp shown in Figs. 1 and 2. Fig. 5 is a side elevation of a detached harp frame, partly broken away and partly in section. Fig. 6 is an end view of the same. Fig. 7 is a vertical sectional view of a detached guide. Fig. 8 is a front elevation of the same. Fig. 9 is a side elevation of a detached guard arm. Fig. 10 is a side elevation of a detached guard wheel and bearing, and Fig. 11 is a plan of the same.

In the accompanying drawings the reference numeral 1 denotes the top of a car adapted to be propelled through the medium of electricity and an over-head trolley system. Upon the top of the car 1 is mounted a plate 2 provided with a socket having a threaded wall with which engages the lower end of a tubular post 3. The upper end of the post 3 is provided with oppositely disposed apertured lugs 4, which are connected to the car top 1 by bracing cables or rods 5. At the top of and within the tubular post 3 is mounted a guide ring 6 for the lower portion 7 of a trolley pole 8. Located within the post 3 is a coiled spring 10 which surrounds and is connected to the lower portion 7 of the pole 8 as at 9. The lower end of the spring 10 is connected to the top of the car 1. The spring 10 cushions the movement of the pole within said post and allows the pole to adjust itself relatively to the car top 1 and the trolley wire or electric conductor over which the trolley passes.

11 denotes a foundation plate carried by the upper end of the pole 8 and secured to this plate by a plurality of screw bolts 12 or other fastening means is a yoke 13 having oppositely disposed side bearing arms 14 which are apertured to receive a pivot pin 15.

16 denotes a harp frame trunnioned or fulcrumed upon the pin 15 and has the under side thereof provided with a longitudinal groove 17 and the ends thereof bifurcated, as at 18. Secured centrally of the groove 17 is a flat spring 19, said spring being held by a screw 20 or other fastening means. The ends of the spring are adapted to project into the bifurcations of the frame 16.

21 denotes coiled springs supported by the bottom of the yoke 13 and which have the upper ends thereof secured, as at 22, to the bottom of the harp frame 16, the upper ends of said springs bearing at the sides of the groove 17. The object of these springs is to normally maintain the harp frame in a horizontal position relatively to the yoke 13 and the plate 11.

The reference character 23 denotes vertically-disposed spring-controlled retaining arms arranged in pairs and with the lower ends of the arms of each pair pivotally supported in the bifurcations of the frame 16 by the pins 24. The arms of each pair are connected together at their lower ends by an integral web 25, the latter projecting into the bifurcations and through which the pins 24 extend. The formation of the webs 25 provides vertical flanges 26 adapted to engage the ends of the frame 16 and limit the outward movement of the retaining arms. The flange 26 of each arm extends below the web thereof and the lower end of the web is adapted to engage the end of the flat spring 19, the latter having for its function to normally retain the retaining arms in a vertical position, but sufficient clearance is provided in the bifurcations of the frame 16 to allow the arms 23 to swing inwardly, as will presently appear.

The space between each pair of retaining arms is indicated by the reference character 27 and the said spaces provide clearance for a trolley wire. The outer end of each of the retaining arms 23 is bifurcated as at 28 and supported therein by a pin 30 is a revoluble roller 29. The rollers 29 enable the retaining arms to ride under supporting wires and bridge structures without injuring either the arms or the structures.

30$^a$ denotes oppositely disposed journal arms carried by the harp frame 16. The outer sides of these arms are provided with recesses 31$^a$ and at the upper and lower ends of said recesses the arms are provided with openings 32 and 33, the former accommodating the journal pin 34 of a trolley wheel 35 adapted to revolve between the journal arms, while the openings 33 provide clearance for barrels 36 carried by the lower curved and bifurcated end 37 of spring-controlled pivoted guard arms 38. The barrels 36 are retained within the recesses 31$^a$ by pivot pins 39, and encircling these pins within the bifurcations 40 of said guard arms are springs 41, one end of each spring bearing against the journal arm and the opposite end extending upwardly in the bifurcation 40 into a socket 42 provided therefor in the guard arm. The inner side of the guard arm above the bifurcation is provided with an inwardly projecting lug 43 and this lug is adapted to rest upon a shoulder 44 provided therefor at the upper end of each journal arm, the shoulder being formed by cutting away the upper and outer edge of each arm.

45 denotes inwardly projecting extensions carried by the upper ends of the arms 38 and in these extensions are pockets 46. The side walls of the pockets are slotted, as at 47, and the top and bottom walls are slotted, as at 48. In the pockets 46 are arranged bearings 49 for revoluble guard wheels 50. The slots 47 provide clearance for the guard wheels 50 and the spindles 51 of said guard wheels are adapted to extend through the bearings 49 into the slots 48, the ends of said spindles guiding the bearings in their movements within the pockets 46. The inner sides of the arms are recessed, as at 52, and slotted, as at 53. Mounted within the recesses 52 upon pins 54 provided therefor are springs 55, the lower ends of said springs engaging in the bottom of the recesses, while the upper ends bear against the rear ends of the bearings 49.

56 denotes links pivotally connected, as at 57, to the outer sides of the retaining arms 23, and the inner ends of the links 56 are pivotally connected, as at 57, to straps 58 slidably mounted upon the outer sides of the journal arms 30. These straps have the outer sides thereof provided with eyelets 59 and attached to said eyelets are the branch cords or cables 60 of a trolley rope or cable (not shown).

The action of the springs 21 holds the harp frame 16 in a horizontal position, the action of the spring 19 holds the guide arms 23 in a vertical position and through the medium of the links 56, the straps 58 will be supported in an elevated position in engagement with the journal arms 30 and the guard arms 38. The action of the springs 41 is to move the guard arms 38 outwardly, but as long as the straps 58 are held in an elevated position, these guard arms are maintained in a vertical position with the guard wheels 50 in proximity to one another.

When it is desired to remove the trolley wheel from the trolley wire, the cords or cables 60 are pulled downwardly thereby lowering the straps 58 and allowing the tension of the springs 41 to force the guard arms outwardly, separating the wheels 50 and providing sufficient clearance for the trolley wire. The straps 58 are not pulled down to that extent as to entirely free the guard arms 38, thereby preventing said arms from swinging downwardly to such a position that they could not be restored to a vertical position by an upward movement of the springs 55. The shiftable guard wheel bearings 49 allow the guard wheels to recede when passing a trolley wire hanger or when passing over a frog or cross-over. The manner of mounting the pole 8 allows the pole to partially rotate, and pivotally mounting the harp frame in the bearing 13, said frame can adjust itself to any irregularities in the trolley wire.

Having now described our invention what we claim as new, is:

1. In a trolley, the combination with a pole, of a harp bearing carried by said pole, a harp frame pivotally mounted in said bearing, journal arms carried by said frame, a trolley wheel revolubly mounted between said journal arms, spring-controlled guard arms carried by said journal arms, and having a normal tendency to move away from each other, guard wheels movably mounted in the upper ends of said guard arms and adapted to extend into proximity to one another, retaining arms carried by the ends of said harp frame, and straps supported by said retaining arms for maintaining the guard arms in operative position.

2. In a trolley, the combination with a pole, of a harp bearing carried thereby, a harp frame pivotally mounted in said bearing, means carried by said bearing and adapted to normally retain said frame in a horizontal position, journal arms carried by said frame, a trolley wheel revolubly mounted between said arms, spring-pressed guard arms carried by said journal arms and adapted to extend over said trolley wheel, spring-pressed guard wheel bearings movably mounted in the upper ends of said guard arms, guard wheels arranged in said bearings, retaining arms carried by the ends of said harp frame, links pivotally connected to said retaining arms, and straps supported by said links for maintaining said guard arms in a vertical position.

3. The combination with a trolley pole, of a harp bearing carried thereby, a harp frame pivotally mounted in said bearing, means carried by said harp bearing and adapted to normally hold said frame in a horizontal position, journal arms carried by said harp frame, a trolley wheel revolubly mounted between said journal arms, spring-pressed guard arms carried by said journal arms and adapted to extend over said trolley wheel, spring-pressed guard wheel bearings arranged in the upper ends of said guard arms, guard wheels carried by said bearings and adapted to extend into proximity to one another, retaining arms carried by the ends of said harp frame, means carried by said harp frame and adapted to normally retain said retaining arms in a vertical position, links pivotally connected to said retaining arms, straps supported by said links for maintaining said guard arms in a vertical position, and means connecting with said straps for shifting said straps, thereby releasing the guard arms.

In testimony whereof we affix our signatures in the presence of two witnesses.

JOSEPH ORSZÁG.
JOHN ORSZÁG.

Witnesses:
JOSEPH NOPOLETANO,
J. E. PILMER.